United States Patent
Eatough et al.

(10) Patent No.: US 7,225,430 B2
(45) Date of Patent: May 29, 2007

(54) SOFTWARE CODE MANAGEMENT METHOD AND APPARATUS

(75) Inventors: David A. Eatough, Herriman, UT (US); James L. Sferas, Sandy, UT (US)

(73) Assignee: LANDesk Software Limited, Dublin (IE)

( * ) Notice: Subject to any disclaimer, the term of this patent is extended or adjusted under 35 U.S.C. 154(b) by 244 days.

(21) Appl. No.: 09/915,862

(22) Filed: Jul. 26, 2001

(65) Prior Publication Data

US 2003/0023860 A1    Jan. 30, 2003

(51) Int. Cl.
G06F 9/44      (2006.01)
G06F 11/00     (2006.01)

(52) U.S. Cl. .................. 717/127; 714/48; 717/170; 719/331

(58) Field of Classification Search ............. 717/162, 717/163, 174, 127, 170
See application file for complete search history.

(56) References Cited

U.S. PATENT DOCUMENTS

| | | | | |
|---|---|---|---|---|
| 4,809,170 A | * | 2/1989 | Leblang et al. | 717/122 |
| 5,339,431 A | * | 8/1994 | Rupp et al. | 717/162 |
| 5,590,056 A | * | 12/1996 | Barritz | 702/186 |
| 5,634,114 A | * | 5/1997 | Shipley | 717/170 |
| 5,960,204 A | * | 9/1999 | Yinger et al. | 717/176 |
| 5,974,470 A | * | 10/1999 | Hammond | 719/331 |
| 6,185,734 B1 | * | 2/2001 | Saboff et al. | 717/164 |
| 6,226,747 B1 | * | 5/2001 | Larsson et al. | 713/200 |
| 6,304,882 B1 | * | 10/2001 | Strellis et al. | 707/202 |
| 6,351,847 B1 | * | 2/2002 | Sakamoto et al. | 717/127 |
| 6,377,977 B1 | * | 4/2002 | Sakata | 709/205 |
| 6,442,752 B1 | * | 8/2002 | Jennings et al. | 717/162 |
| 7,028,019 B2 | * | 4/2006 | McMillan et al. | 707/1 |
| 2003/0007173 A1 | * | 1/2003 | Nishide et al. | 358/1.15 |

* cited by examiner

Primary Examiner—Tuan Dam
Assistant Examiner—Michael Yigdall
(74) Attorney, Agent, or Firm—Madson & Austin

(57) ABSTRACT

A method and apparatus for managing the use of a software code by a selected application program are disclosed. The method includes detecting an instance of using the code, identifying the application program that is using the code, confirming a conflict between the code and the application, and reporting the conflict to one or more selected parties. Confirmation of the conflict may occur by using a database whose content includes a plurality of selected application programs, along with a corresponding plurality of proper software codes, such as DLL files, which are appropriate for each of the selected application programs to use. A computer workstation or networked computer system may embody the method in the form of instructions stored in a machine-accessible medium.

29 Claims, 7 Drawing Sheets

SOFTWARE CODE MANAGEMENT METHOD AND APPARATUS

FIELD OF THE INVENTION

The present invention relates generally to methods and apparatus for managing files within computer systems. More particularly, the present invention relates to methods and apparatus which are used to detect, confirm, record, and report the use of designated incorrect or improper software codes, such as library files, by various application programs within a computer system.

BACKGROUND INFORMATION

As technology advances, computers provide increasingly useful and rapid service to their users. Much of the advantage provided by computers, however, arises as a derivative of the increased processing speed, that is, the ability to run larger and more complex programs. Of course, many tasks performed by a computer, such as clearing a display of graphics, connecting to a network, etc. are repetitive. Thus, one method of simplifying the job of programming is to re-use software routines as much as possible. As software continues to evolve, then, and programs become more complex, increasing reliance is placed on the re-use and recycling of various modules which support application program operations. Software modules or subroutines which are routinely used by other programs are often grouped into a single program file, known as a "library".

Using the Microsoft Windows™ Operating System (hereinafter "Windows™") as a well-known example, it is understood by those skilled in the art that a popular library file type can be recognized in a file listing by the appended designation characters "DLL". Those who formulate these dynamic link library files, or "DLL files" often intend that they be used by many different programs. However, just as for any other type of software, DLL files are subject to constant improvement and upgrades. And, as is also the case for most other software, upgrades for DLL files are typically published under a new version number.

For example, an application program might make use of a DLL file having the name "testlibrary.dll". This library may be published, upon initial release, with a version number of "1.0". Minor upgrades or changes to Version 1.0 might in turn be published with a version number of "1.05" or "1.1", and would include small revisions to improve the function of the program, or possibly to correct minor flaws in operational functionality. Major changes will usually be accompanied by greater changes in the version number, such as "2.0" or "3.1". Thus, by tracking the version number attached to any particular software code or library, it is possible to gain an idea as to whether the most recent version of software is being used. More important, observing the version number attached to the software code will also give information as to whether the correct version of the code is being used.

Most software application programs make use of auxiliary software codes, including libraries, such as the exemplary DLL files described above. One of the most common problems when using such software codes is loading an improper version of the code by the application software, which may occur in several different ways. For example, one application may load one version of a DLL file, while another instance of the same application loads a different version of the same DLL file. Alternatively, a single application might load a DLL file version that differs from a previously-loaded version. Either occurrence might cause the application to perform erroneously. Thus, in each case, the application has loaded an improper version of the auxiliary software code. This problem usually arises after an end user, unaware of the specific interaction between a particular program and its associated auxiliary software codes, attempts to improve his system by "upgrading" to the latest version of an application program. Either the application expects to use a newer version of the auxiliary code in question, or upgrading to a particular auxiliary code may clash with other application software that has been modified to operate with a previous version of the code. In any event, incorrect answers, unexpected operations, or even catastrophic failure may result.

Computer systems have historically been rather poor at alerting the system administrator and/or end user as to the root cause of such problems. Thus, determining the cause is often a time-intensive and costly exercise. Unfortunately, the frequency of occurrence for such problems increases with the growing number of application programs attempting to use (or re-use) commonly-available auxiliary software codes, such as, for example, the DLL files provided for use with Windows™.

DESCRIPTION OF THE PREFERRED EMBODIMENTS

Figure 1:
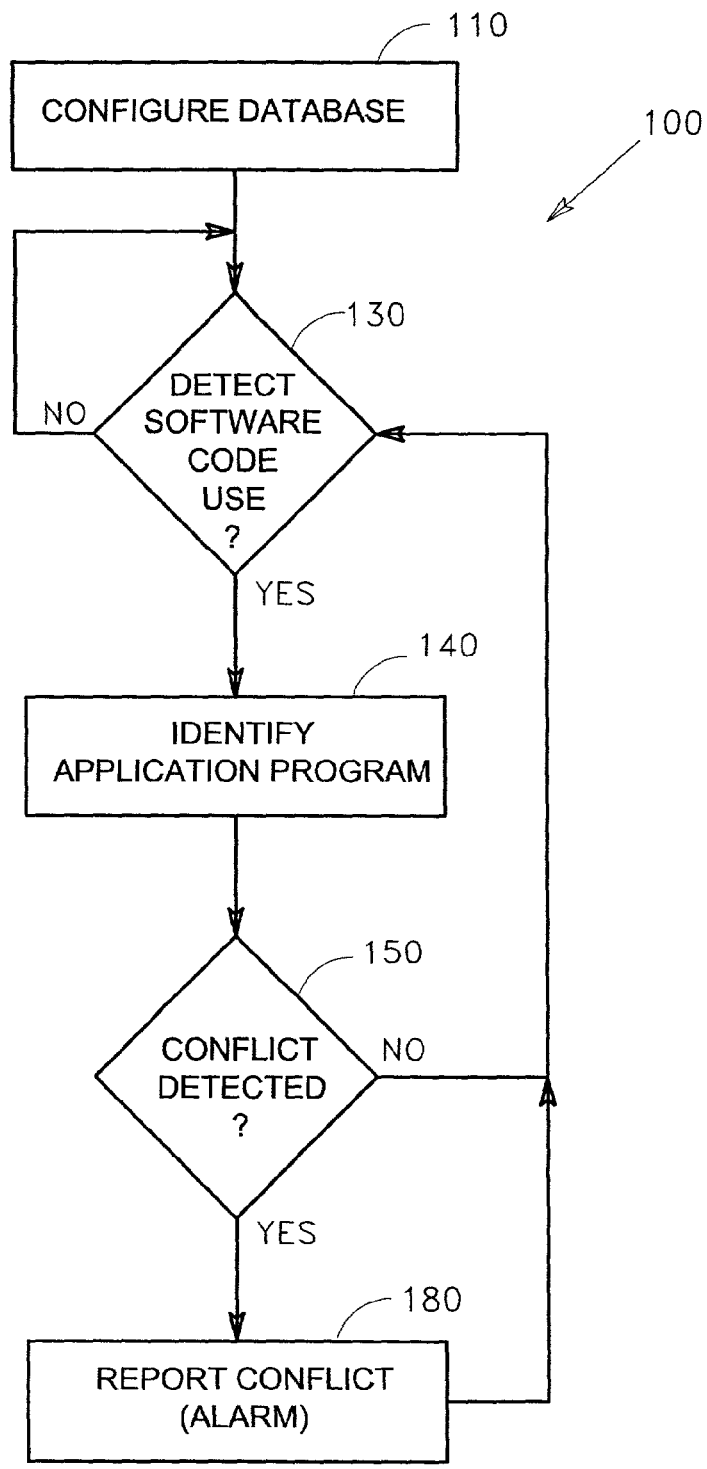
FIG. 1 is a flow chart diagram of a method for managing the use of software codes by an application program according to the teachings of the present invention.

In the following detailed description of the preferred embodiments, reference is made to the accompanying drawings which form a part hereof, and in which are shown by way of illustration, and not of limitation, specific embodiments in which the invention may be practiced. In the drawings, like numerals describe substantially similar components or procedures throughout the several views. The embodiments illustrated are described in sufficient detail to enable those skilled in the art to practice the invention. Other embodiments may be utilized and derived therefrom, such that structural, logical, and electrical circuit substitutions and changes may be made without departing from the scope of the invention. The following detailed description, therefore, is not to be taken in a limiting sense, and the scope of the invention is defined only by the appended claims, along with the full range of equivalents to which such claims are entitled.

The present invention is useful for managing the use of software codes by application programs. The methods and apparatus disclosed herein offer the opportunity to record information surrounding the use of, for example, incorrect versions of software codes, including the identity and location of the application which is using or has loaded the incorrect code, the location and version of the code actually used or loaded, and the location and version of the code that should properly have been used or loaded. These methods and apparatus also allows selecting various parties, such as the end user, computer operator, system administrator, and other chosen parties, to receive reports of the recorded information.

According to the teachings of the present invention, a method and apparatus for managing the use of a software code by a selected application program are disclosed. The method includes detecting an instance of using the code, identifying the application program that is using the code, confirming a conflict between the code and the application, and reporting the conflict to one or more selected parties.

Confirmation of the conflict usually occurs with the assistance of a database, whose content typically includes several selected application programs and corresponding correct software codes which are appropriate for use by each of the selected application programs. Thus, for example, whenever an inappropriate version of a software code is loaded by one of the application programs identified in the database, the use will be confirmed, and the type of conflict will be determined and reported. If desired, the conflict can also be corrected. This method, along with the machine-accessible medium, the workstation, and the networked computer system which embody the method, make it possible to consistently manage the proper use of software codes by various application programs. Therefore, single workstation users and system administrators alike can be informed in a timely fashion when incorrect versions of such codes are being used by selected application programs.

For the purposes of this document, a "software code" is any set of executable instructions, or a set of software subroutines, similar to or identical to a DLL file, which can be loaded into a computer memory under the direction of an application program. A software code may be in the form of source code or object code. An "improper software code" may be defined in several different ways, as will be described below. In general, however, an improper software code is any software code other than that which is specified (either directly or indirectly) by the system administrator as being a proper or acceptable software code to be used by a particular software application program. Thus, while there may be nothing wrong with the improper software code in and of itself, it is deemed an "improper" software code simply because someone (usually the system administrator) designates another version of the software code, for example, as the correct and proper software code which should be used by a particular application program. Of course, as will be described more fully below, automated methods may also be used to determine the proper software codes for use with selected application programs.

Referring now to FIG. 1, a flow chart diagram of a method for managing the use of software codes by an application program according to the teachings of the present invention can be seen. The method 100 begins with configuring a database in block 110. The database, described in greater detail below, typically includes a list of one or more selected application programs, along with, for example, a corresponding list of designated acceptable or "proper" software codes which may be used by each of the application programs. This particular database configuration thus defines any software code loaded or used by the application programs included in the database which is not listed as one of the designated acceptable or proper software codes for that particular application program, as an "improper software code". Other definitions are also possible, as will be described below.

The method continues with detecting the use of a software code in decision block 130, which typically means monitoring the loading and/or execution of some selected type of software code. As will be explained in more detail below, detection can be accomplished in several different ways. However, once the use of a selected software code module or type is detected, the method continues on to block 140, where the application using the code is identified. Until use of a selected software code type is detected, the method pauses at decision block 130.

After the application program that is using the software code (i.e., "using" generally understood to mean effecting operations such as loading, executing, or calling for the execution of the software code) is identified in block 140, then the method continues at decision block 150 with confirming whether a conflict exists between the application program and the software code using it. If no conflict exists, then the method returns to decision block 130, pausing until another use of a software code is detected.

If a conflict exists, as determined at decision block 150, then the method continues onward to block 180, wherein the conflict is reported, usually to the operator of the computer executing the application program identified in block 140, or to the system administrator responsible for configuring the database. The report may be accompanied by an alarm. After reporting the conflict in block 180, the method returns to block 130, pausing until another use of a software code is detected.

Figure 2A:
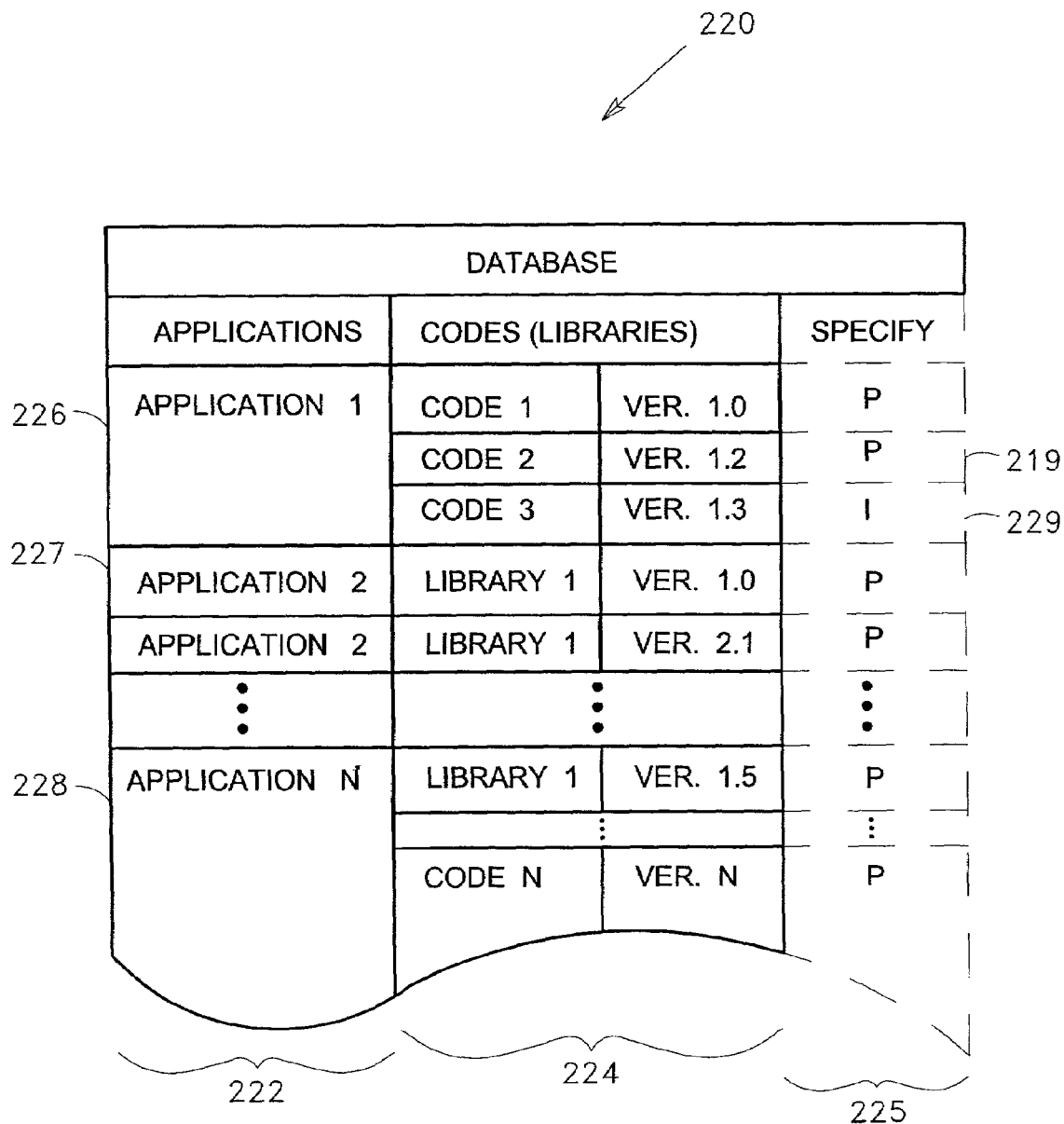
FIG. 2A is a conceptual diagram of an exemplary database and its content which may be used to determine the existence of conflicts caused by the use of software codes.

Turning now to FIG. 2A, a conceptual diagram an exemplary database and its content which may be used to confirm the existence of conflicts caused by the use of improper software codes can be seen. As noted above, the database 220 typically includes entries for several application programs in column 222, such as Application 226, Application2 227, and other selected applications, such as ApplicationN 228. Corresponding to each of the applications in column 222 may be several software codes understood to be defined as "proper" software codes in column 224. Each entry in column 224 may, for example, take the form of a list of one or more library files corresponding to each of the selected application programs 226, 227, and 228.

As shown in FIG. 2A, for example, the proper software codes corresponding to Application1 (i.e., those software codes which may be properly loaded, executed, or "used" in any other fashion by Application1) may be designated as: Code1, Code2, and Code3. Similarly, the proper software code corresponding to Application2 may be designated as Library1. Finally, the proper software codes corresponding to ApplicationN may be designated as Library1 through LibraryN. In each case, corresponding to each one of the selected application programs 226, 227, and 228, one or more acceptable or proper software codes may be designated for use by the application program without creating a conflict.

It should also be noted that the database 220 may also include some form of further identifying information for the software codes, such as version numbers. For example, a shown in FIG. 2A, the complete identification of proper software codes corresponding to Application1 might be designated as: Code1, Version 1.0; Code2, Version 1.2; and Code3, Version 1.3. Similarly, designated as corresponding to Application2 might be Library1, Version 1.0 or Version 2.1 (in this case, for example, either version of Library1 may be used with Application 2 without creating a conflict); and corresponding to ApplicationN might be designated Library1, Version 1.5 through LibraryN, Version N.

While not shown explicitly in the database 220, each of the selected application programs 222, as part of the designation "Application1", "Application2", and "ApplicationN" may also be identified by a version number, a date, a filename, a file size, or any other information desired, such that, for example, two versions of a selected application program may each have database entries and corresponding proper (and different) software codes, as determined by the system administrator.

As mentioned above, the invention provides several ways to designate or define an "improper software code". One definition has already been used in conjunction with FIGS. 1 and 2, that is, an improper software code may be designated as such if it is not included in a particular list of one or more approved software codes which may be properly used by a selected application program. Another definition includes the reverse of what has been previously described. That is, the system administrator may also define or designate an improper software code as any code which is included in the database 220. Thus, any software code entered into the database and used by a listed application program would then be considered an "improper software code", creating a conflict. Any other software codes used by the listed application programs (i.e., not entered into the database 220 as corresponding to the selected application program) would be considered "proper" software codes, and create no conflict.

Another possible procedure used to define or designate improper software codes is accomplished by using further identifying information. For example, an optional database column 225 may be used to contain defining information for every software code, such as a letter "P" for a proper software code 219, and an "I" for an improper software code 229.

To summarize some of the possible ways that a system administrator may define improper software codes then, one may consider that if column 225 does not exist in the database 220, the administrator may have defined all software codes in the database as proper software codes, and any software codes used by the applications in column 222 which do not match the specified software codes in column 224 thus represent a conflict. Alternatively, those skilled in the art will realize that the absence of column 225 may also be used by an administrator to define all software codes included in column 224 as "improper" software codes, such that any software codes used by the applications specified in column 222 that fail to match the software codes specified in column 224 for the selected application in column 222 are proper software codes. Thus, only the use of software codes specified in column 224 will result in a conflict in that case. Finally, if column 225 is present in the database 220, the system administrator may designate each software code as either "P" for "proper" or "I" for improper, and assume all other software codes not listed in column 224 of the database and used by the applications listed in column 222 are either improper, or proper, as desired.

Figure 2B:
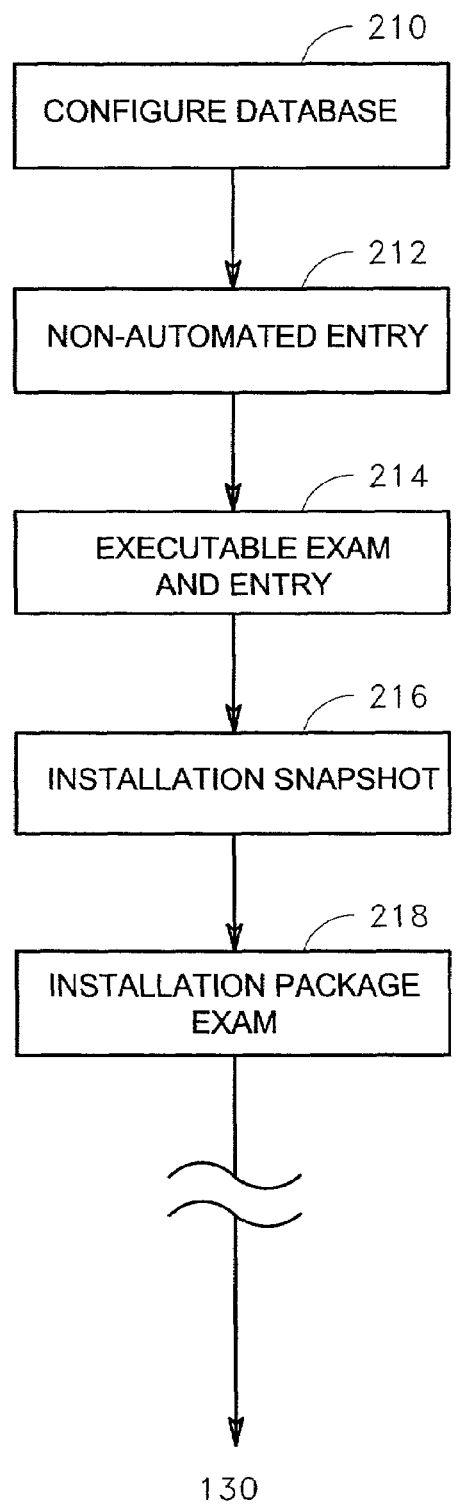
FIG. 2B is a flow chart diagram illustrating procedures which may be used to configure the database shown in FIG. 2A.

Referring now to FIG. 2B, a flow chart diagram illustrating a procedure which may be used to configure the database 220 can be seen. For example, configuring the database 220 may include obtaining information relating to one or more of the application programs 222 (and corresponding software codes 224) in a non-automated fashion, as noted in block 212. Thus, a system administrator, computer operator, end user, or Independent Software Vendor (ISV) may manually enter a list of the selected applications 222 into the database 220, along with the corresponding list of software codes 224.

Alternatively, as noted in block 214, one or more of the application programs 222 may be associated with an executable code that is amenable to examination, such that determination of the correct database 220 entries 222, 224 can be effected by automated examination of the executable code. After automated examination of the executable codes for selected applications 222, for example, the information returned regarding corresponding software codes 224, such as the correct versions of DLL files, can then be entered into the database, manually, or by using an automated routine.

Another possibility for entering data regarding the selected applications 222 and corresponding software codes 224, as noted in block 216, includes using a snapshot of the installation activity required for one or more of the selected application programs. Thus, as an application is automatically installed into a computer workstation or networked computer system, a record of the various software codes installed along with the application program can be recorded, and the record used as the input to another automated routine for populating the database 220 with the desired information 222, 224. Of course, such information 222, 224 can also be entered into the database 220 in a non-automated fashion.

Finally, another alternative for entering the information 222, 224 into the database 220 includes automated examination of a system resident installation package, such as a Microsoft™ Software Installer (MSI) software package, to determine the identity of various applications 222 and software codes 224, followed by non-automated (or automated) entry of the information 222, 224 into the database, as denoted in block 218. After any or all of these blocks 212, 214, 216, and 218 may be used to configure the database 220 by populating it with one or more selected applications 222 and corresponding software codes 224, the method continues with block 130 (see FIG. 1), waiting for the detection of software code use.

Figure 3:
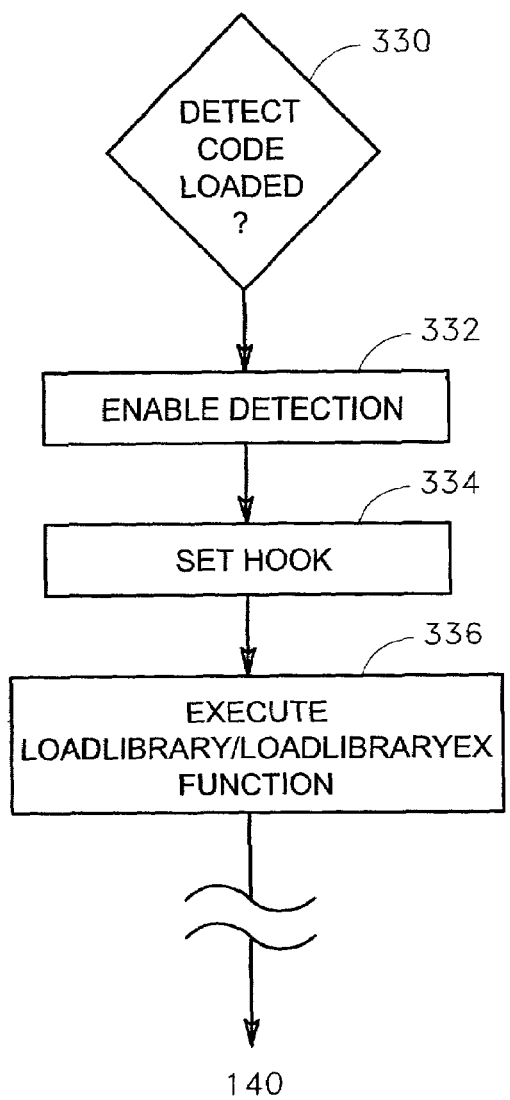
FIG. 3 is a flow chart diagram illustrating additional procedures which may be used to detect the use of software codes by an application program according to the teachings of the present invention.

Turning now to FIG. 3, a flow chart diagram illustrating additional procedures which may be used to detect the use of software codes by an application program according to the teachings of the present invention can be seen. Detecting use of an software code in block 330 may include, for example, enabling detection of the use of a particular software code, such as a specific subroutine or software module, or enabling detection of the use of a selected subset of software code types, such as DLL files, as noted in block 332. This also includes enabling detection of library loading operations by a selected application program.

Enabling detection of software code use (e.g., enabling detection of a software library loading operation) in block 332 may occur in several ways, such as by enlisting the aid of a monitoring program or function. As noted in block 334, for example, one way to tap into a computer messaging stream might be to use a "hook" function, assuming that the selected application program operates under Windows™. Creating a hook function inserts a function into the Windows™ message handling chain. Once installed, the hook function can monitor messages, and even alter them. System-wide hook functions can intercept all messages that enter a system. Application-specific hook functions allow interception only of messages directed at a specified window or application.

Continuing with the example of hook functions, when using an application-specific hook, it is possible to select various categories of messages that the hook will receive. For example, it is possible to insert a hook that receives only keyboard messages. It is also possible to receive all messages associated with an application. Windows™ implements hooks by maintaining a pointer to each hook function that has been installed in the system. Each hook function is called automatically thereafter by the operating system when a message relating that hook occurs in the input stream. As noted in block 336, execution of the Windows™ LoadLibrary( ) and LoadLibraryEx( ) function calls, for example, typically used to load DLL files by application programs running under Windows™, can be intercepted by setting a software hook activated by the library loading operation. This can be accomplished using the software hook functions set up in block 334, as is well-known to those skilled in the art. Thus, every time a DLL file is loaded by an application program, for example, if the proper hook has been set, the method will be able to detect use of a DLL file. After use of the software code has been detected, the method continues with identifying the application making use of the code in block 140 (see FIG. 1).

It should be noted that Windows™ and software hook functions are merely used herein as examples, and not by way of limitation, due to the widespread use and familiarity in industry with this particular operating system and its functions. Those skilled in the art will realize that other monitoring functions, which operate similarly to or identically to hook functions, can be devised and used within other operating systems to detect the use of particular types, classes, or subsets of software codes, so that the procedures of the present invention may be effected thereby.

Figure 4:
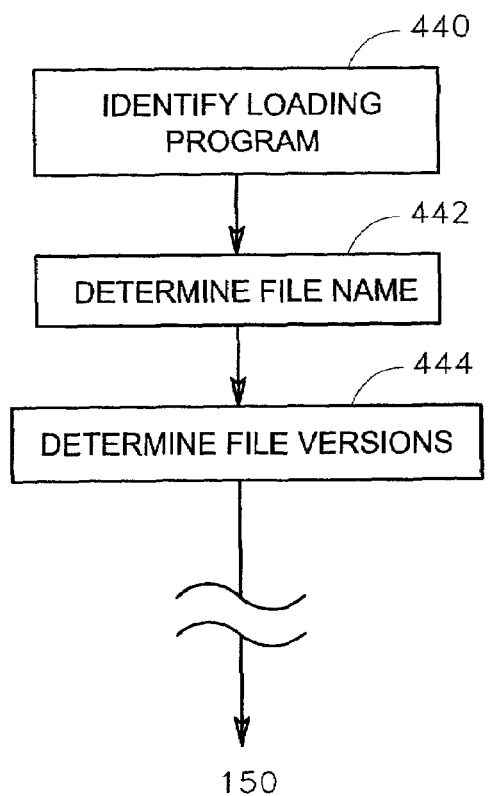
FIG. 4 is a flow chart diagram illustrating additional procedures which may be used to identify the application using software codes according to the teachings of the present invention.

Turning now to FIG. 4, a flow chart diagram illustrating additional procedures which may be used to identify the application using software code according to the teachings of the present invention can be seen. For example, as noted in block 442, identifying the selected application program in block 440 may include determining the file name of the application program. In addition, the selected application program may also be identified by determining its application version number, as noted in block 444. The selected application program may also be identified using any of the other information stored in the database, as noted above, and other information, such as the name, location, and/or configuration of the computer system executing the application program. After the selected application program is identified, confirmation as to whether a conflict exists may occur in block 150 (see FIG. 1).

A conflict exists when the software code used by one or more applications is inconsistent with the usage rules set forth in the database by the system administrator, as described in detail above. For example, conflicts may occur when two instances of the same selected application make use of a different version of a software code, such as a DLL file. Conflicts may also occur when the same application makes use of a different version of a software code than was previously used. And, as noted above by example, a conflict may occur when an application makes use of a software code not listed in the database, and whose use is therefore forbidden.

Figure 5:
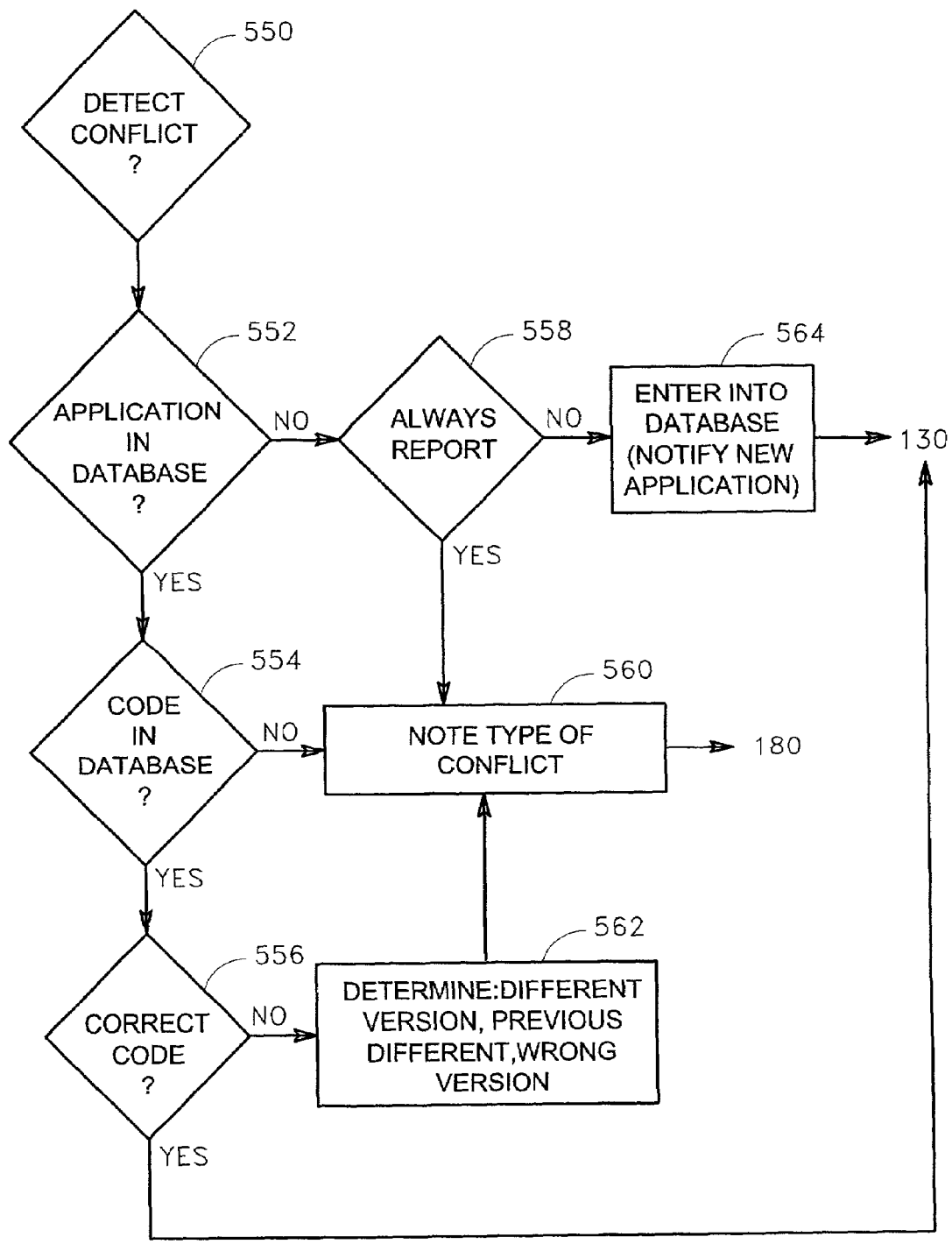
FIG. 5 is a flow chart diagram illustrating additional procedures which may be used to confirm a conflict regarding the use of software codes by an application program according to the teachings of the present invention.

Turning now to FIG. 5, a flow chart diagram illustrating additional procedures which may be used to confirm a conflict regarding the use of improper software code by an application program according to the teachings of the present invention can be seen. Thus, confirming a conflict between a selected application program and an improper software code, as noted in block 550, may include determining whether the identified selected application is included in the database in block 552. If so, then a determination is made as to whether the software code used by the application has also been entered into the database in block 554. If so, then a final determination is made as to whether the software code is the same as one or more proper software code entries for the selected application program (i.e., the detected software code database entry should correspond to the database entry for the identified selected application program in this case). If so, there is no conflict, and the method returns to block 130, waiting until the use of a software code is again detected.

If the conflict is that the identified application is not located in the database, for example, as determined in block 552, then the method may determine whether these circumstances are always to be reported in block 558. If so, then the type of conflict may be noted in block 560 (e.g., "Application currently executing and making use of a software code is not entered in the database."), and reported in block 180 (see FIG. 1). If no report is needed, as determined in block 558, then the method may include entering the identified application into the database, along with the identity of the software code being used by the application, as noted in block 564. The end user, system administrator, or other selected parties may also be notified of the existence of a new database entry in block 564. At this point, the method may continue with block 130 (see FIG. 1), pausing to detect the use of another software code. The procedures of blocks 558 and 564 may be useful, for example, in the context of an automated system which configures the database, and thereafter detects and reports the occurrence of conflicts between previously executed applications and their historical use of software codes.

If the conflict is that the software code is not in the database, but the application has an entry, for example, as determined in block 554, then this type of conflict can also be noted in block 560 (e.g., "Application currently executing is entered in the database, but the software code used is not entered in the database."), and reported in block 180 (see FIG. 1). If the software code is not the correct code, but has an entry in the database, as does the application, as determined in block 556, then the particular type of conflict can be determined in block 562. This may include, as noted above, two instances of the same selected application operating while using a different version of the software code, the same application operating while using a different version of a software code than was previously used, or an application operating while using a forbidden software code. The type of conflict is then noted in block 560 (e.g., "Application currently executing is entered in the database, but the software code used is not historically accurate."), and reported in block 180 (see FIG. 1).

In summary, confirming a conflict between the improper software code and the selected application program may be as simple as determining that the improper software code is not the same as the proper software code corresponding to the application, as entered in the database. This may be discovered, for example, by determining that the proper software code has a version number which differs from the version number associated with the improper software code. The procedures required to make this discovery may include determining the version number of the proper software code and the version number of the improper software code, and comparing the version number of the proper software code to the version number of the improper software code.

Figure 6:
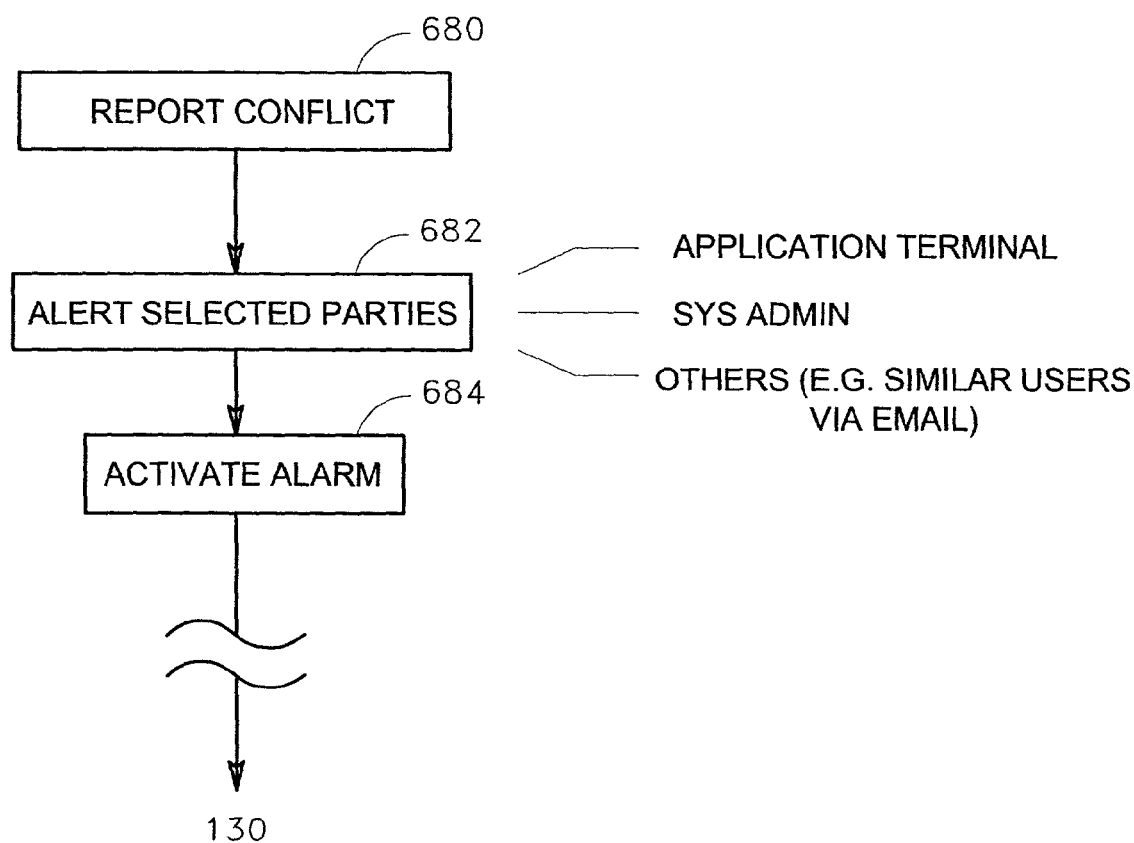
FIG. 6 is a flow chart diagram illustrating additional procedures which may be used to report the use of software codes by an application program according to the teachings of the present invention.

Turning now to FIG. 6, a flow chart diagram illustrating additional procedures which may be used to report the use of improper software code by an application program according to the teachings of the present invention can be seen. Thus, reporting the conflict in block 680 may include alerting one or more selected parties, such as by messaging the system administrator or the end user, or by sending a message to the video display or terminal associated with the executing application program, or even by sending out an electronic mail message to the current user and all past users of the application program in block 682. Reporting the conflict may also include activating an audio, tactile, or visual alarm in block 684. After reporting (and possibly alarming) the conflict, the method continues with block 130 (see FIG. 1), pausing to detect the use of another software code.

It will be understood by those of ordinary skill in the art that the embodiments shown in FIGS. 1–6 illustrate several different ways of implementing the novel method of managing, such as by detecting, confirming, and reporting use of an improper software code by an application program. The invention, embodied in a method, includes detecting an instance of using the code, identifying the application program using the code, confirming a conflict between the code and the application, and reporting the conflict. Thus, one of ordinary skill in the art will understand upon reading this description that the method of the present invention can be used in applications other than those outlined with respect to the exemplary database described above, and indeed, using components of databases other than application program file names and DLL file names and version numbers, and thus, the invention is not to be so limited. The illustrations of methods and an exemplary database in FIGS. 1–6 are intended to provide a general understanding of some applications which may be served by the present invention, and are not intended to serve as a complete description of all the elements and features of methods which make use of the novel mechanism for managing use of improper software codes described herein.

FIGS. 1–6 are similarly useful in presenting the application of hardware which may be constructed according to the teachings of the present invention. Those of ordinary skill in the art will realize that various circuits, apparatus, and systems may be assembled and used in accordance with the methods described in the various figures. Applications which may embody the novel management mechanism for use of improper software codes as described in this document include electronic circuitry and software used in high-speed computers, arrays of memory modules and other circuit cards, device drivers, communication circuitry, modems, processor modules, memory integrated circuits, embedded processors, set-top clients, networked client-server systems, and application-specific modules, including multilayer, multi-chip modules. Such circuitry and software may further be included as sub-components within a variety of electronic systems, such as televisions, cellular telephones, personal computers, aircraft, and others. To further clarify such use, several embodiments of circuitry, apparatus, and systems constructed according to the teachings of the present invention will now be specifically illustrated.

Figure 7:
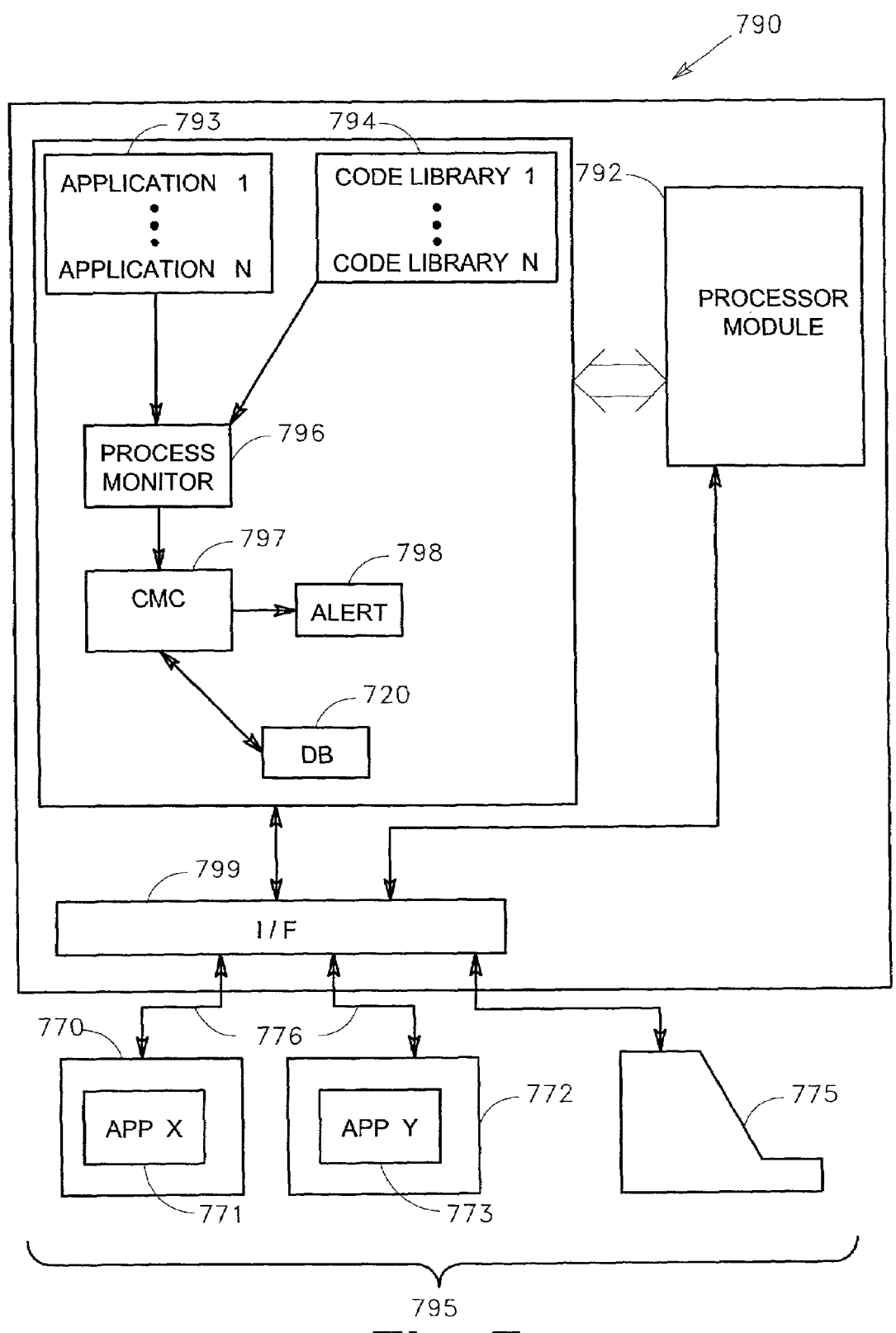
FIG. 7 is a schematic block diagram of a computer workstation and computer system network constructed according to the teachings of the present invention.

Referring now to FIG. 7, a machine-accessible medium, a schematic block diagram of a computer workstation, and a schematic block diagram of a computer system network constructed according to the teachings of the present invention can be seen. The computer workstation 790, which may be a stand alone computer, such as a personal computer, may include a processor module 792 and a machine-accessible medium (such as a Random Access Memory (RAM), Programmable Read Only Memory (PROM), a hard disk, or a removable floppy disk/CD-ROM in a disk drive) 791 communicatively coupled to the processor module 792. The machine-accessible medium 791 may include instructions stored thereon, for example, as embodied by one or more software modules 793, 794, 796, 797, 798, and a database 720, capable of causing the processor module 792 to perform the method of managing use of a software code by a selected application program, as shown and described in FIGS. 1–6. That is, the method performed by the processor module 792, which may be a software program module or a hardware module, such as a microprocessor, typically includes the procedures of detecting use of a software code, identifying the selected application program that is using the software code, confirming a conflict between the software code and the selected application program, and reporting the conflict. In FIG. 7, all of the modules, which may be hardware, firmware, or software program modules, or a combination of these, may include a Process Monitoring Component (PMC) 796, a Conflict Monitoring Component (CMC) 797, and an Alerting/Reporting Module (A/RM) 798.

Using the example of Windows™ as an operating system, the PMC 796 can be used to hook CreateProcess calls (to determine when a new application program is loaded), and/or LoadLibrary and LoadLibraryEx function calls, which are typically used to load DLL files, as described above. Thereafter, whenever the PMC 796 detects software code use, the PMC 796 will notify the CMC 797 that a file 794 (e.g., a DLL file) has just been loaded, including desired information about the application or process 793 loading the file 794 and the location of the file 794 being loaded.

The CMC 797 may then use the information obtained from the PMC 796 to determine the version of the file 794 which has been loaded. The version can then be checked against the approved version entered into the database 720, for example, to confirm that a conflict exists, as described with respect to FIG. 5. If there is a conflict, a report can be made using the user console 775 associated with the application program 793, via the interface 799, and/or an alert can be activated using the A/RM 798 as explained with regard to the process illustrated by FIG. 6.

In addition, the CMC 797, which may be notified whenever a file (application program and/or software code) is loaded, can be used to record every instance of file loading activity to build a historical database 720 in an automated fashion, obviating the need for manual data entry, as described above. Of course, the database 720 may also be configured by any of the methods described with respect to FIGS. 2A and 2B, being similar to or identical to the database 220. Thus, those of ordinary skill in the art will realize that the computer workstation 790, in conjunction with the processor module 792 and the machine-accessible medium 791, is capable of performing each and every activity outlined in FIGS. 1–6, and described herein, with regard to the method and teachings of the present invention.

Similarly, the teachings of the present invention may also be embodied in a computer system network 795, including a server 790 and one or more clients 770, 772 communicatively coupled to the server 790, perhaps using a company-wide intranet 776, or a global communications network 776. In this case, execution of a selected application program, such as AppX 771, may be initiated by the client 770, instead of the server 790. Similarly, execution of another selected application program, such as AppY 773, may be initiated by the client 772. The applications in this case may reside on either the clients 770, 772, or the server 790 (e.g., the applications 793). In any case, the server includes a processor module 792, and a machine-accessible medium 791 communicatively coupled to the processor module 792. The machine-accessible medium 791 has instructions stored thereon capable of causing the processor module 792 to perform the method of managing use of an improper software code (which may reside within the server 790 or clients 770, 772) by the selected application program. As noted with respect to the computer workstation 790, the server 790 and computer system network 795 are also capable of performing each and every activity outlined in FIGS. 1–6, and described herein, with regard to the method and teachings of the present invention.

Thus, the present invention provides novel methods, machine-accessible media, computer workstations, and computer system networks to manage use of improper computer codes by selected application programs. Such methods and apparatus provide the ability to detect, record, and report information surrounding the use of such improper software codes, such as the identity and location of the application loading an incorrect version of a software code, the location and version of the code actually loaded, and the location and version of the code that should properly have been loaded. The results of such reporting can be made selectively available to the application end user, computer operator, the system administrator, and other chosen parties, using local screen displays and/or global messaging. The method, along with the machine-accessible medium, the workstation, and the networked computer system which embody the method, make it possible to consistently manage the use of software codes (such as the exemplary DLL files described previously) by various application programs, providing timely information to single workstation users and system administrators alike.

Although specific embodiments have been illustrated and described herein, it will be appreciated by those of ordinary skill in the art that any arrangement which is calculated to achieve the same purpose may be substituted for the specific embodiments shown. These applications are intended to cover any and all adaptations or variations of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of the invention includes any other applications in which the above methods and structures are used. Therefore, the scope of the invention should be determined with reference to the appended claims, along with the full range of equivalents to which such claims are entitled.

What is claimed is:

1. A method for managing execution of a software code by a selected application program, comprising:

configuring a database having a plurality of application programs, wherein each one of the plurality of application programs corresponds to at least one designated software code, wherein the plurality of application programs includes the selected application program, and wherein the corresponding at least one designated software code is not the software code executed by the selected application program;

detecting the execution of all or a portion of the software code, wherein the detecting is not performed by the software code;

identifying the selected application program that is executing the software code;

confirming a conflict between the selected application program and the software code in response to the application program executing the software code, wherein the conflict between the selected application program and the software code is confirmed after the execution of the software code has been detected, and wherein confirming the conflict includes determining that the executed software code is not correct for the selected application program; and after confirming the conflict, recording that the selected application and the executed software code conflict in the database.

2. The method of claim 1, wherein configuring the database further includes:

obtaining information relating to at least one of the plurality of application programs and corresponding at least one designated software code in a non-automated fashion.

3. The method of claim 1, wherein configuring the database further includes:

entering information relating to at least one of the plurality of application programs and the corresponding at least one designated software code by using a snapshot of installation activity required for the at least one of the plurality of application programs.

4. The method of claim 1, wherein at least one of the plurality of applications programs is associated with a system resident installation package, and wherein configuring the database further includes:

entering information relating to the at least one of the plurality of application programs and the corresponding at least one designated software code by automated examination of the system resident installation package.

5. The method of claim 1, wherein confirming a conflict between the software code and the selected application program further includes:

determining that the software code is not the same as the corresponding at least one designated software code.

6. The method of claim 5, wherein the corresponding at least one designated software code has a version number which differs from a version number associated with the software code executed by the selected application program, and wherein determining that the improper software code is not the same as the corresponding at least one designated software code further includes:

determining the version number of the corresponding at least one designated software code and the version number of the software code executed by the selected application program; and comparing the version number of the corresponding at least one designated software code to the version number of the software code executed by the selected application program.

7. The method of claim 1, wherein the software code is a software library, and wherein detecting execution of the software code further includes:
enabling detection of a library loading operation.

8. The method of claim 7, wherein enabling detection of a library loading operation further includes:
setting a software hook activated by the library loading operation.

9. The method of claim 1, wherein identifying the selected application program further includes:
determining a file name of the selected application program.

10. The method of claim 1, wherein the selected application program has an application version number, and wherein identifying the selected application program further includes:
determining the application version number.

11. The method of claim 1, further including:
reporting the conflict; and
alerting a selected party regarding the conflict.

12. The method of claim 11, wherein the selected party is an end user of the selected application program.

13. The method of claim 1, further including:
reporting the conflict; and
activating an alarm.

14. The method of claim 1, wherein at least one of the plurality of application programs is associated with an executable code, and wherein configuring the database further includes:
obtaining information relating to the at least one of the plurality of application programs and the corresponding at least one designated software code by automated examination of the executable code; and
entering the information into the database.

15. A computer workstation, comprising:
a processor module; and
a machine-accessible medium communicatively coupled to the processor module, the machine-accessible medium having instructions associated therewith for managing execution of a software code by a selected application program, which when executed are capable of causing the processor module to perform:
configuring a database having a plurality of application programs, wherein each one of the plurality of application programs corresponds to at least one designated software code, wherein the plurality of application programs includes the selected application program, and wherein the corresponding at least one designated software code is not the software code executed by the selected application program;
detecting the execution of all or a portion of the software code, wherein the detecting is not performed by the software code;
identifying the selected application program that is executing the software code;
confirming a conflict between the software code and the selected application program in response to the application program executing the software code, wherein the conflict between the selected application program and the software code is confirmed after the execution of the software code has been detected, and wherein confirming the conflict includes determining that the executed software code is not correct for the selected application program; and
after confirming the conflict, recording that the selected application and the executed software code conflict in the database.

16. The computer workstation of claim 15, wherein confirming a conflict between the software code and the selected application program further includes:
determining that the software code executed by the selected application program is not the same as the corresponding at least one designated software code.

17. The computer workstation of claim 16, wherein the corresponding at least one designated software code has a version number which differs from a version number associated with the software code executed by the selected application program, and wherein determining that the software code executed by the selected application program is not the same as the corresponding at least one designated software code further includes:
determining the version number of the corresponding at least one designated software code and the version number of the software code executed by the selected application program; and
comparing the version number of the corresponding at least one designated software code to the version number of the software code executed by the selected application program.

18. The computer workstation of claim 15, wherein the software code is a software library, and wherein detecting execution of the software code further includes:
enabling detection of a library loading operation.

19. The computer workstation of claim 18, wherein enabling detection of a library loading operation further includes:
setting a software hook activated by the library loading operation.

20. The computer workstation of claim 15, wherein at least one of the plurality of application programs is associated with an executable code, and wherein configuring the database further includes:
obtaining information relating to the at least one of the plurality of application programs and the corresponding at least one designated software code by automated examination of the executable code; and
entering the information into the database.

21. A computer system network, comprising:
a server comprising:
a processor module;
a machine-accessible medium communicatively coupled to the processor module, the machine-accessible medium having instructions associated therewith for managing execution of a software code by a selected application program, which when executed are capable of causing the processor module to perform:
configuring a database having a plurality of application programs, wherein each one of the plurality of application programs corresponds to at least one designated software code, wherein the plurality of application programs includes the selected application program, and wherein the corresponding at least one designated software code is not the software code executed by the selected application program;
detecting the execution of the software code, wherein the detecting is not performed by the software code;
identifying the selected application program that is executing the software code;
confirming a conflict between the software code and the selected application program in response to the application program executing the software code, wherein the conflict between the selected application program and the software code is confirmed after the execution of the software code has been detected, and wherein confirming the conflict includes determining that the executed software code is not correct for the selected application program; and after confirming the conflict, recording that the selected application and the executed software code conflict in the database; and a client communicatively coupled to the server, wherein execution of the selected application program is initiated by the client.

22. The computer system network of claim 21, wherein the database is stored on the server.

23. The computer system network of claim 21, wherein confirming a conflict between the software code and the selected application program further includes:

determining that the software code is not the same as the corresponding at least one designated software code.

24. The computer system network of claim 21, wherein at least one of the plurality of application programs is associated with an executable code, and wherein configuring the database further includes:

obtaining information relating to the at least one of the plurality of application programs and the corresponding at least one designated software code by automated examination of the executable code; and entering the information into the database.

25. A machine-accessible medium having instructions associated therewith for managing execution of a software code by a selected application program, which when executed are capable of causing a processor module to perform:

configuring a database having a plurality of application programs, wherein each one of the plurality of application programs corresponds to at least one designated software code, wherein the plurality of application programs includes the selected application program, and wherein the corresponding at least one designated software code is not the software code executed by the selected application program;

detecting the execution of the software code, wherein the detecting is not performed by the software code;

identifying the selected application program that is executing the software code;

confirming a conflict between the improper software code and the selected application program in response to the application program executing the software code, wherein the conflict between the selected application program and the software code is confirmed after the execution of the software code has been detected, and wherein confirming the conflict includes determining that the executed software code is not correct for the selected application program; and after confirming the conflict, recording that the selected application and the executed software code conflict in the database.

26. The machine-accessible medium of claim 25, wherein confirming a conflict between the software code and the selected application program further includes:

determining that the software code executed by the selected application program is not the same as the corresponding at least one designated software code.

27. The machine-accessible medium of claim 26, wherein the corresponding at least one designated software code has a version number which differs from a version number associated with the software code executed by the selected application program, and wherein determining that the software code executed by the selected application program is not the same as the corresponding at least one designated software code further includes:

determining the version number of the proper software code and the version number of the improper software code; and comparing the version number of the corresponding at least one designated software code to the version number of the software code executed by the selected application program.

28. The machine-accessible medium of claim 25, wherein the software code is a software library, and wherein detecting execution of the software code further includes:

enabling detection of a library loading operation.

29. The machine-accessible medium of claim 25, wherein at least one of the plurality of application programs is associated with an executable code, and wherein configuring the database further includes:

obtaining information relating to the at least one of the plurality of application programs and the corresponding at least one designated software code by automated examination of the executable code; and entering the information into the database.

* * * * *